(12) United States Patent
Zheng et al.

(10) Patent No.: US 12,000,564 B1
(45) Date of Patent: Jun. 4, 2024

(54) PROJECTION DEVICE FOR GENERATING METEOR LIGHTING EFFECT AND PROJECTION LAMP FOR GENERATING METEOR LIGHTING EFFECT

(71) Applicant: Shenzhen Bolong Technology Co. Ltd., Shenzhen (CN)

(72) Inventors: Huazhu Zheng, Shenzhen (CN); Caijian Zheng, Shenzhen (CN); Wenzhen Ouyang, Shenzhen (CN); Yunyun Lu, Shenzhen (CN)

( * ) Notice: Subject to any disclaimer, the term of this patent is extended or adjusted under 35 U.S.C. 154(b) by 0 days.

(21) Appl. No.: 18/397,995

(22) Filed: Dec. 27, 2023

(30) Foreign Application Priority Data

Dec. 6, 2023 (CN) .......................... 202323335225.6

(51) Int. Cl.
*F21V 11/14* (2006.01)
*F21V 5/00* (2018.01)
*F21V 14/08* (2006.01)
*F21W 121/00* (2006.01)

(52) U.S. Cl.
CPC .............. *F21V 11/14* (2013.01); *F21V 5/008* (2013.01); *F21V 14/08* (2013.01); *F21W 2121/008* (2013.01)

(58) Field of Classification Search
CPC ... F21W 2121/008; F21V 5/008; F21V 11/14; F21V 14/08; F21S 10/007; G03B 31/06; G03B 23/06
See application file for complete search history.

(56) References Cited

U.S. PATENT DOCUMENTS

| | | | |
|---|---|---|---|
| 11,092,301 B2 | 8/2021 | Zheng et al. | |
| 11,281,083 B1* | 3/2022 | Xin | G03B 21/145 |
| 11,353,183 B1 | 6/2022 | Zhang | |
| 11,428,376 B1* | 8/2022 | Xin | F21S 10/063 |
| 11,614,211 B1 | 3/2023 | Peng | |
| 11,662,071 B1* | 5/2023 | Wang | F21V 5/04 |
| | | | 362/268 |
| 2008/0230795 A1* | 9/2008 | Dias | H01L 33/504 |
| | | | 257/E33.061 |

(Continued)

FOREIGN PATENT DOCUMENTS

CN 113357574 A * 9/2021

OTHER PUBLICATIONS

Machine translation of CN-113357574-A, retrieved from worldwide. espacenet.com on Feb. 12, 2024 (Year: 2024).*

*Primary Examiner* — Abdulmajeed Aziz
*Assistant Examiner* — Steven Y Horikoshi

(57) ABSTRACT

Disclosed are a projection device for generating a meteor lighting effect and a projection lamp for generating a meteor lighting effect, wherein the projection device for generating the meteor lighting effect comprises: a first incoherent light source, wherein the first incoherent light source has an irradiation surface; a first optical path plate, wherein the first optical path plate partially covers the irradiation surface of the first incoherent light source; a second optical path plate, wherein the second optical path plate is arranged on one side that is of the first optical path plate and that is far away from the first incoherent light source; and a driving assembly, wherein the driving assembly is in driving connection with the first optical path plate to drive the first optical path plate to rotate.

18 Claims, 11 Drawing Sheets

(56) References Cited

U.S. PATENT DOCUMENTS

| | | | |
|---|---|---|---|
| 2015/0308663 A1* | 10/2015 | Jurik | F21V 17/007 |
| | | | 362/277 |
| 2017/0219176 A1* | 8/2017 | Chang | A63J 5/025 |
| 2019/0120450 A1* | 4/2019 | Chien | F21V 5/04 |
| 2021/0247039 A1* | 8/2021 | Zheng | F21V 5/04 |
| 2021/0381666 A1* | 12/2021 | Zheng | F21V 5/005 |
| 2022/0099261 A1* | 3/2022 | Wei | F21V 21/30 |
| 2022/0299858 A1 | 9/2022 | Li | |
| 2023/0079299 A1 | 3/2023 | Peng | |

* cited by examiner

PROJECTION DEVICE FOR GENERATING METEOR LIGHTING EFFECT AND PROJECTION LAMP FOR GENERATING METEOR LIGHTING EFFECT

CROSS-REFERENCE TO RELATED APPLICATIONS

The application claims priority of Chinese patent application CN202323335225.6, filed on Dec. 6, 2023, which is incorporated herein by reference in its entireties.

TECHNICAL FIELD

The present invention relates to the technical field of projection, and in particular, to a projection device for generating a meteor lighting effect and a projection lamp for generating a meteor lighting effect.

BACKGROUND

With the continuous advancement of the times, the quality of life of people is continuously improved, and people have an increasing demand for environmental lighting and visual experience. In this context, a projection lamp, which is an electrical appliance capable of projecting images or characters on the ground or a wall, is becoming an indispensable part of people's lives. The projection lamp is not only widely applied to places such as stages, bedrooms and automobile lamps, but also plays an important role in the fields of commercial presentation, education and training and the like.

However, although the projection lamp has made certain progress in pattern presentation, the existing research and development efforts have focused on achieving diversification of patterns, resulting in a relatively single function of the projection lamp. Although the conventional projection lamp can provide a certain colorful effect in projecting patterns, the conventional projection lamp is still limited in lighting effect, and the pursuit of users for high-quality and diversified visual experiences is difficult to meet.

SUMMARY

A primary objective of the present invention is to provide a projection device for generating a meteor lighting effect, aiming to improve the diversity of lighting effects projected by existing projection devices.

In order to achieve the above objective, the projection device for generating the meteor lighting effect provided by the present invention comprises:
- a first incoherent light source, wherein the first incoherent light source has an irradiation surface;
- a first optical path plate, wherein the first optical path plate partially covers the irradiation surface of the first incoherent light source, and at least one strip-shaped light-transmitting hole is formed in the first optical path plate from a central axis of the first optical path plate toward an outer side direction of the first optical path plate;
- a second optical path plate, wherein the second optical path plate is arranged on another side that is of the first optical path plate and that is far away from the first incoherent light source, at least one strip-shaped light-transmitting area is arranged at a position that is of the second optical path plate and that corresponds to the irradiation surface of the first incoherent light source, and the light-transmitting area is arranged to intersect with a projection of the light-transmitting hole on a horizontal plane; and
- a driving assembly, wherein the driving assembly is in driving connection with the first optical path plate to drive the first optical path plate to rotate.

Optionally, the second optical path plate is provided with a plurality of light-transmitting areas, and the plurality of light-transmitting areas are arranged non-parallel to each other.

Optionally, there are a plurality of light-transmitting holes, and the plurality of light-transmitting holes are arranged at intervals around the central axis of the first optical path plate.

Optionally, the first optical path plate is gear-shaped, the driving assembly comprises a driving motor and a driving gear arranged on the driving motor, and the driving gear is engaged with the first optical path plate.

Optionally, the second optical path plate has a central axis, and the second optical path plate rotates with the central axis as a rotation center.

Optionally, the projection device further comprises a lens group arranged above the light-transmitting area of the second optical path plate, and the lens group comprises a fixing sleeve and at least one first imaging lens arranged in the fixing sleeve.

The present invention further provides a projection lamp for generating a meteor lighting effect, which comprises:
- a housing, wherein the housing is provided with a first light-emitting hole;
- a first incoherent light source, wherein the first incoherent light source is arranged in the housing, and the first incoherent light source emits light toward the first light-emitting hole;
- a first optical path plate, wherein the first optical path plate is arranged in the housing, the first optical path plate partially covers an irradiation surface of the first incoherent light source, and at least one strip-shaped light-transmitting hole is formed in the first optical path plate from a central axis of the first optical path plate toward an outer side direction of the first optical path plate;
- a second optical path plate, wherein the second optical path plate is mounted on the housing, the second optical path plate is arranged on another side that is of the first optical path plate and that is far away from the first incoherent light source, at least one strip-shaped light-transmitting area is arranged at a position that is of the second optical path plate and that corresponds to the irradiation surface of the first incoherent light source, and the light-transmitting area is arranged to intersect with a projection of the light-transmitting hole on a horizontal plane; and
- a driving assembly, wherein the driving assembly is arranged in the housing, the driving assembly is in driving connection with the first optical path plate to drive the first optical path plate to rotate.

Optionally, the light-transmitting area is long strip-shaped, the second optical path plate is provided with a plurality of light-transmitting areas, and the plurality of light-transmitting areas are arranged non-parallel to each other.

Optionally, there are a plurality of light-transmitting holes, and the plurality of light-transmitting holes are arranged at intervals around the central axis of the first optical path plate.

Optionally, the first optical path plate is gear-shaped, the driving assembly comprises a driving motor and a driving gear arranged on the driving motor, and the driving gear is engaged with the first optical path plate.

Optionally, the second optical path plate has a central axis, and the second optical path plate rotates with the central axis as a rotation center.

Optionally, the projection lamp further comprises a lens group arranged above the light-transmitting area of the second optical path plate, and the lens group comprises a fixing sleeve with one end fixed to the first light-emitting hole and at least one first imaging lens arranged in the fixing sleeve.

Optionally, the projection lamp further comprises a first fixing seat arranged in the housing, and the first incoherent light source, the first optical path plate and the driving assembly are fixed on the first fixing seat.

Optionally, the housing is provided with a first mounting hole, the projection lamp comprises a mounting bracket arranged in the housing, the lens group and the second optical path plate are arranged on the mounting bracket, and the second optical path plate partially extends out of the housing from the first mounting hole.

Optionally, the mounting bracket is provided with a first limiting boss, a side wall of the second optical path plate is provided with a limiting rod, a limiting groove is formed in the first limiting boss, the second optical path plate is arranged in the first limiting boss, and the limiting rod is located in the limiting groove.

Optionally, the projection lamp further comprises a light-emitting mechanism, the light-emitting mechanism comprises a light-emitting assembly, a film assembly and an imaging assembly, and the housing is provided with a second mounting hole and a second light-emitting hole;

the light-emitting assembly is arranged in the housing and comprises at least one second incoherent light source and at least one condenser lens, the second incoherent light source emits light towards the second light-emitting hole, and the condenser lens is arranged on an irradiation surface of the second incoherent light source;

the film assembly is arranged in the second mounting hole and comprises a film sheet with a galaxy starry sky pattern, and the film sheet is arranged on another side of the condenser lens relative to the second incoherent light source; and the imaging assembly is arranged in the housing and comprises at least one second imaging lens, at least one adjusting lens and at least one wide-angle lens which are sequentially arranged in a projection direction of the film sheet.

Optionally, the film assembly further comprises a second fixing seat and a film tray, the film sheet is arranged on the film tray, the second fixing seat is fixed in the housing at a position corresponding to the second mounting hole, and the film tray is inserted into the second mounting hole and extends into the second fixing seat.

Optionally, the driving assembly comprises a driving motor and a driving gear arranged on the driving motor, the film assembly further comprises a rotary gear engaged with the driving gear, the film sheet is fixed on the rotary gear, the film tray is provided with a mounting groove, a bottom wall of the mounting groove is provided with a limiting hole, a second limiting boss is arranged on one side of the rotary gear, the rotary gear is arranged in the mounting groove, and the second limiting boss is located in the limiting hole.

Optionally, the film assembly further comprises a fixing buckle, the film sheet is fixedly arranged on the fixing buckle, and a clamping block matched with the fixing buckle is arranged on another side of the rotary gear relative to the second limiting boss.

Optionally, the film assembly further comprises an annular buckle for fixing the rotary gear, and a clamping hole matched with the annular buckle is formed at the bottom of the mounting groove.

According to the technical solution of the present invention, the first incoherent light source, the first optical path plate and the second optical path plate are arranged at intervals in the same direction, wherein the surface of the first optical path plate partially covers the irradiation surface of the first incoherent light source, and the first optical path plate is provided with a strip-shaped light-transmitting hole at a position irradiated by the first incoherent light source to form a long strip-shaped light beam; meanwhile, the second optical path plate is provided with a strip-shaped light-transmitting area at the irradiation surface of the first incoherent light source, and the strip-shaped light-transmitting area intersects with a projection of the strip-shaped light-transmitting hole on the horizontal plane, so that the light projected by the first incoherent light source appears as a meteor-like light spot on a light-shadow bearing surface after passing through the light-transmitting hole of the first optical path plate and the light-transmitting area of the second optical path plate; in addition, the first optical path plate is driven to rotate by the driving assembly, so that the intersection position of the light-transmitting hole and the light-transmitting area on the horizontal plane constantly moves to further form a meteor-shooting lighting effect; therefore, the diversity of the lighting effects projected by the projection device is effectively improved.

BRIEF DESCRIPTION OF DRAWINGS

In order to more clearly illustrate the technical solutions in the embodiments of the present invention or in the prior art, the drawings required to be used in the description of the embodiments or the prior art are briefly introduced below. It is obvious that the drawings in the description below are some embodiments of the present invention, and those of ordinary skill in the art can obtain other drawings according to the structures illustrated in these drawings without creative efforts.

Figure 1:
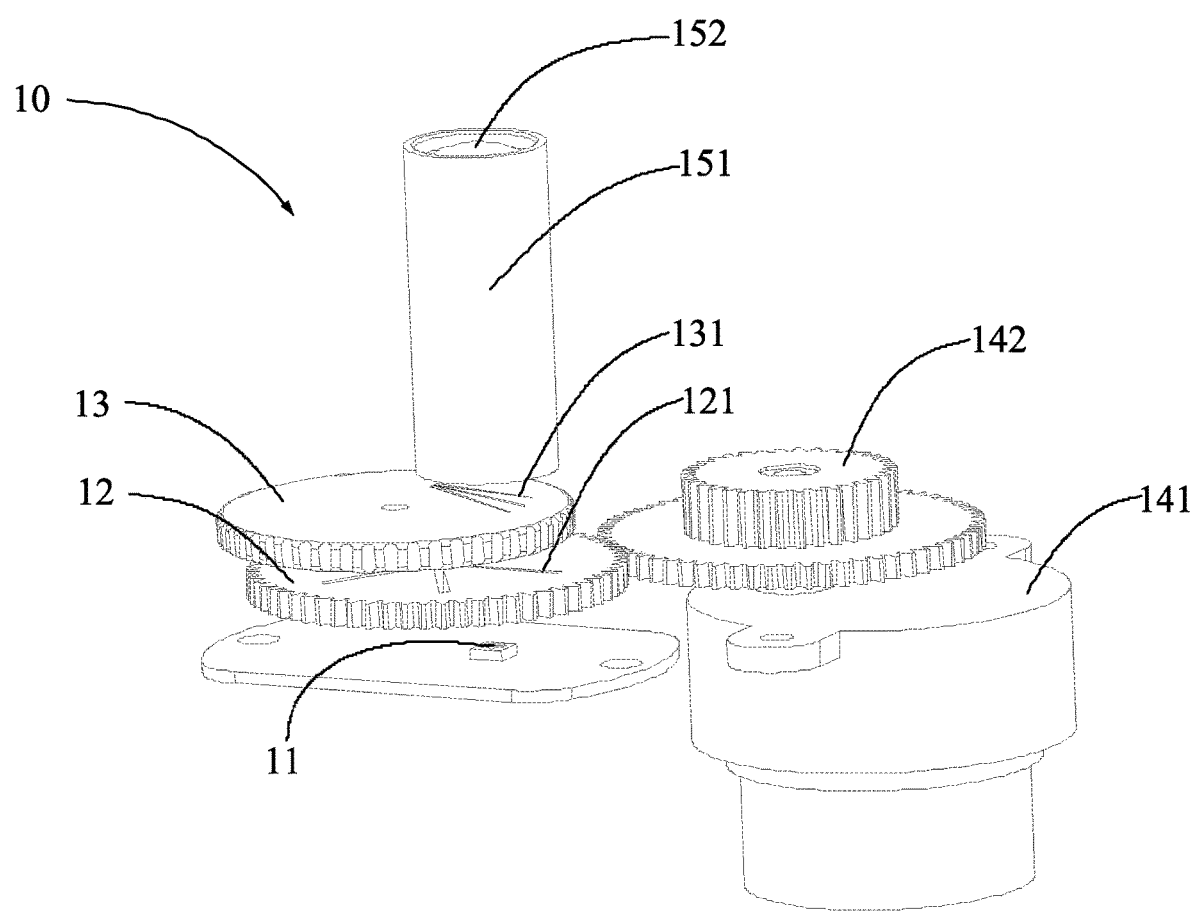
FIG. 1 is a schematic structural diagram of an embodiment of a projection device for generating a meteor lighting effect according to the present invention.

| Reference numeral | Name | Reference numeral | Name |
| --- | --- | --- | --- |
| 10 | Projection device | 20 | Housing |
| 11 | First incoherent light source | 21 | First light-emitting hole |
| 111 | Irradiation surface of first incoherent light source | 22 | First mounting hole |
| | | 23 | Second mounting hole |
| 12 | First optical path plate | 24 | Second light-emitting hole |
| 121 | Light-transmitting hole | 30 | Mounting bracket |
| | | 31 | First limiting boss |
| 13 | Second optical path plate | 311 | Limiting groove |
| | | 40 | First fixing seat |
| 131 | Light-transmitting area | 50 | Light-emitting assembly |
| 132 | Limiting rod | 51 | Second incoherent light source |
| 14 | Driving assembly | | |
| 141 | Driving motor | 52 | condenser lens |
| 142 | Driving gear | 60 | Film assembly |
| 151 | Fixing sleeve | 61 | Film sheet |
| 152 | First imaging lens | 62 | Second fixing seat |
| 70 | Imaging assembly | 63 | Film tray |
| 71 | Second imaging lens | 631 | Mounting groove |
| 72 | Adjusting lens | 632 | Limiting hole |
| 73 | Wide-angle lens | 633 | Clamping hole |
| 65 | Rotary gear | 64 | Fixing buckle |
| 651 | Second limiting boss | 80 | Clearance groove |
| | | 90 | Transmission gear |
| 652 | Clamping block | | |
| 66 | Annular buckle | | |

The realization of the objectives, the functional features, and the advantages of the present invention will be further explained in conjunction with the embodiments and with reference to the drawings.

DETAILED DESCRIPTION

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

The present invention provides a projection device 10 for generating a meteor lighting effect.

In an embodiment of the present invention, as shown in FIGS. 1 to 3 and 9 to 12, the projection device 10 for generating the meteor lighting effect comprises:

a first incoherent light source 11, wherein the first incoherent light source 11 has an irradiation surface;

a first optical path plate 12, wherein the first optical path plate 12 partially covers the irradiation surface 111 of the first incoherent light source 11, and at least one strip-shaped light-transmitting hole 121 is formed in the first optical path plate 12 from a central axis of the first optical path plate 12 toward an outer side direction of the first optical path plate 12;

a second optical path plate 13, wherein the second optical path plate 13 is arranged on one side that is of the first optical path plate 12 and that is far away from the first incoherent light source 11, at least one strip-shaped light-transmitting area 131 is arranged at a position that is of the second optical path plate 13 and that corresponds to the irradiation surface 111 of the first incoherent light source 11, and the light-transmitting area 131 is arranged to intersect with a projection of the light-transmitting hole 121 on a horizontal plane; and a driving assembly 14, wherein the driving assembly 14 is in driving connection with the first optical path plate 12 to drive the first optical path plate 12 to rotate.

In this embodiment, the first incoherent light source 11 is a light-emitting member of the projection device 10, and the first incoherent light source 11 may be an LED light source, a super-radiation light-emitting diode and a broadband light source, which is not specifically limited herein. The irradiation surface 111 of the first incoherent light source 11 is a light-emitting surface of the first incoherent light source 11, the first optical path plate 12 is a first component of the projection device 10 for changing a lighting effect, specifically, the surface of the first optical path plate 12 partially covers the irradiation surface 111 of the first incoherent light source 11, and at least one strip-shaped light-transmitting hole 121 is formed in the first optical path plate 12, so that when the light of the first incoherent light source 11 passes through the light-transmitting hole 121 of the first optical path plate 12, a long strip-shaped light beam is formed on another side of the first optical path plate 12, the second optical path plate 13 is arranged on another side of the first optical path plate 12 relative to the first incoherent light source 11, wherein at least one strip-shaped light-transmitting area 131 is arranged at a position that is of the second optical path plate 13 and that corresponds to the irradiation surface of the first incoherent light source 11, the light-transmitting area 131 intersects with the projection of the light-transmitting hole 121 on the horizontal plane, it can be understood that the light emitted from the first incoherent light source 11 can only pass through an intersection point between the light-transmitting hole 121 of the first optical path plate 12 and the light-transmitting area 131 of the second optical path plate 13 and then be presented on the light-shadow bearing surface, and other light of the first incoherent light source 11 can be blocked by the first optical path plate 12 and the second optical path plate 13, so that the light emitted from the first incoherent light source 11 can only be presented in the form of meteor-like dots on the light-shadow bearing surface. Meanwhile, the driving assembly 14 is configured to drive the first optical path plate 12 to rotate, so that the intersection position of the light-transmitting hole 121 of the first optical path plate 12 and the light-transmitting area 131 of the second optical path plate 13 on the horizontal plane continuously moves, and a meteor-shooting lighting effect is presented on the light-shadow bearing surface.

It should be explained that the second optical path plate 13 is made of a transparent material, and the light-transmitting area 131 of the second optical path plate 13 refers to a long strip-shaped light-transmitting area 131 reserved on an outer surface of the second optical path plate 13 by using screen printing, sticker, and the like.

According to the technical solution of the present invention, the first incoherent light source 11, the first optical path plate 12 and second optical path plate 13 are arranged at intervals in the same direction, wherein the surface of the first optical path plate 12 partially covers the irradiation surface 111 of the first incoherent light source 11, and the first optical path plate 12 is provided with a light-transmitting hole 121 at a position irradiated by the first incoherent light source 11 to form a long strip-shaped light beam; meanwhile, the second optical path plate 13 is provided with a light-transmitting area 131 at the irradiation surface 111 of the first incoherent light source 11, and the light-transmitting area 131 intersects with a projection of the light-transmitting hole 121 on the horizontal plane, so that the light projected by the first incoherent light source 11 appears as a meteor-like light spot on a light-shadow bearing surface after passing through the light-transmitting hole 121 of the first optical path plate 12 and the light-transmitting area 131 of the second optical path plate 13; in addition, the first optical path plate 12 is driven to rotate by the driving assembly 14, so that the intersection position of the light-transmitting hole 121 and the light-transmitting area 131 on the horizontal plane constantly moves to further form a meteor-shooting lighting effect; therefore, the diversity of the lighting effects projected by the projection device 10 is effectively improved.

Further, as shown in FIGS. 1 to 3 and 9 to 12, the second optical path plate 13 is provided with a plurality of light-transmitting areas 131, and the plurality of light-transmitting areas 131 are arranged non-parallel to each other. In this embodiment, the light-transmitting area 131 is long strip-shaped, and the second optical path plate 13 is provided with a plurality of light-transmitting areas 131 that are not parallel to each other, so that the light-transmitting holes 121 of the first optical path plate 12 intersect with the plurality of light-transmitting areas 131 on a horizontal plane at the same time, and then a plurality of light spots with the meteor effects are presented on the light-shadow bearing surface, and the first optical path plate 12 is driven to rotate by the driving assembly 14, therefore, a meteor shooting-like lighting effect is presented on the light-shadow bearing surface, and thus the diversity of the lighting effects projected by the projection device 10 is effectively improved.

Further, as shown in FIGS. 1 to 3 and 9 to 12, there are a plurality of light-transmitting holes 121, and the plurality of light-transmitting holes 121 are arranged at intervals around the central axis of the first optical path plate 12. In this embodiment, since the first optical path plate 12 continuously rotates, in the rotating process, only the light-transmitting hole 121 is located on the irradiation surface 111 of the first incoherent light source 11, a meteor lighting effect is formed, and the provision of one long strip-shaped light-transmitting hole 121 makes the time interval of the meteor lighting effect presentation too long, so that a plurality of light-transmitting holes 121 are provided in this embodiment, thereby effectively increasing the frequency of intersection of the light-transmitting hole 121 and the light-transmitting area 131, further reducing the interval time of the meteor lighting effect, forming a meteor shower-like lighting effect, and thus effectively improving the diversity of the lighting effect projected by the projection device 10.

Figure 2:
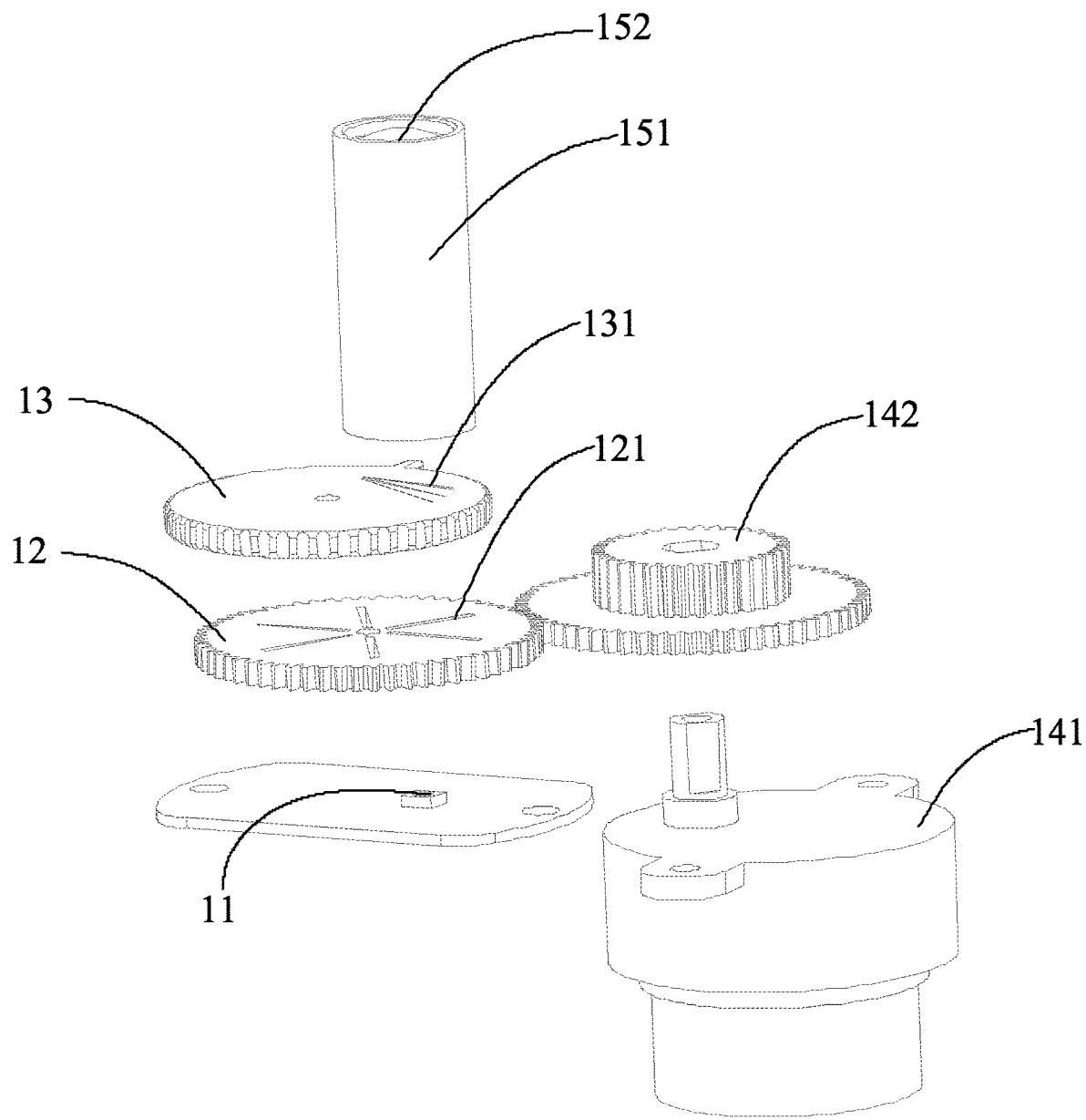
FIG. 2 is a schematic structural diagram of a projection device for generating a meteor lighting effect according to the present invention in an angle exploded state.

Further, as shown in FIGS. 1 and 2, the first optical path plate 12 is gear-shaped, the driving assembly 14 comprises a driving motor 141 and a driving gear 142 arranged on the driving motor 141, and the driving gear 142 is engaged with the first optical path plate 12. In this embodiment, the driving assembly 14 may drive the first optical path plate 12 to rotate through a belt, or may drive the first optical path plate 12 to rotate through a gear, and the belt may slip in a transmission process; consequently, the meteor light projected by the projection device 10 is stuck, affecting user experience. Therefore, the driving assembly 14 of this embodiment uses a gear to drive the first optical path plate 12 to rotate. Specifically, the first optical path plate 12 is provided in a gear shape, the driving assembly 14 comprises a driving motor 141 and a driving gear 142 located on the driving motor 141, and the driving gear 142 is engaged with the first optical path plate 12, so that the driving motor 141 drives the first optical path plate 12 to rotate, and the gear transmission can effectively prevent the first optical path plate 12 from slipping, thereby effectively improving the structural stability of the projection device 10.

Figure 3:
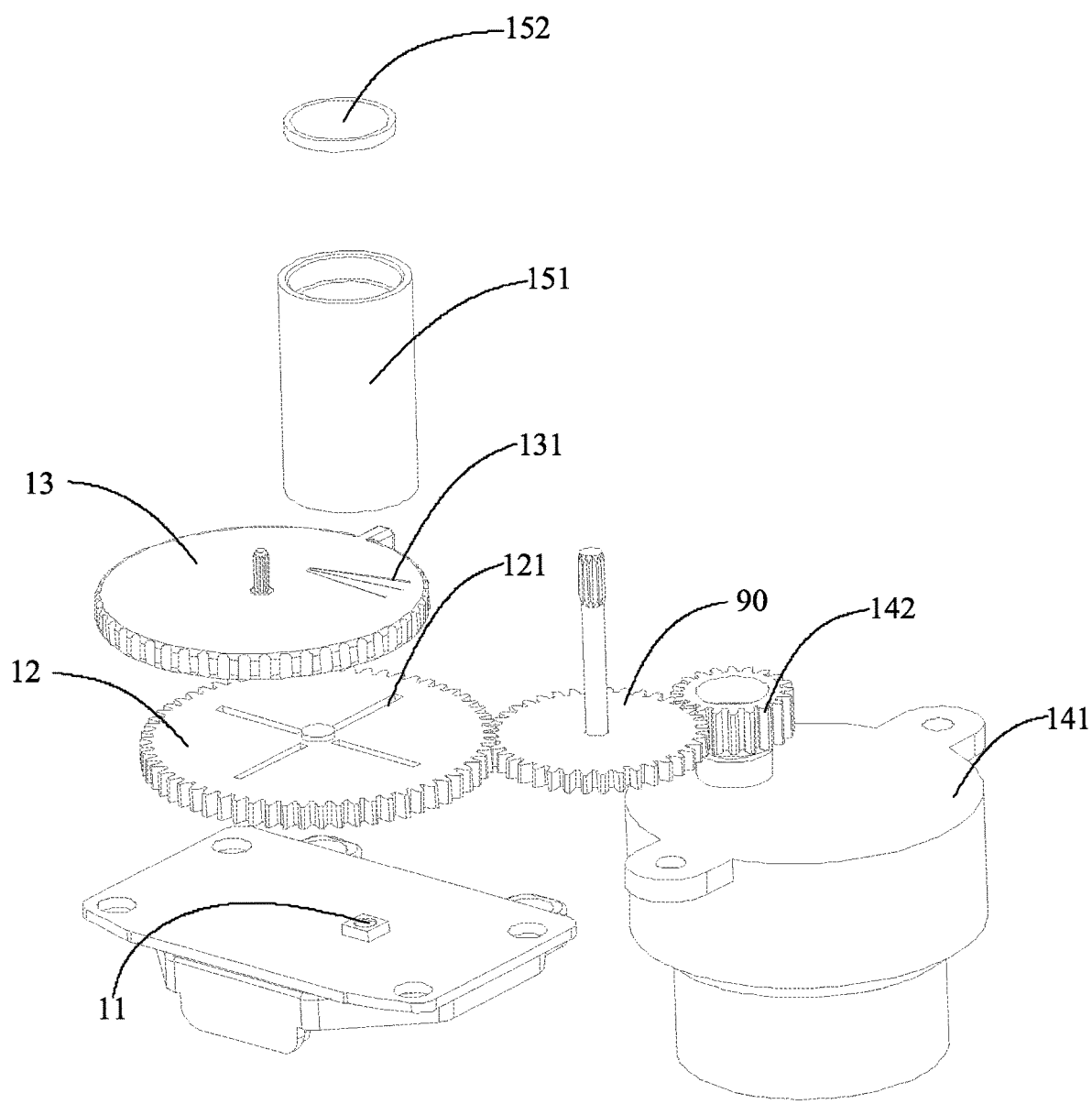
FIG. 3 is a schematic structural diagram of another embodiment of a projection device for generating a meteor lighting effect according to the present invention.
Figure 4:
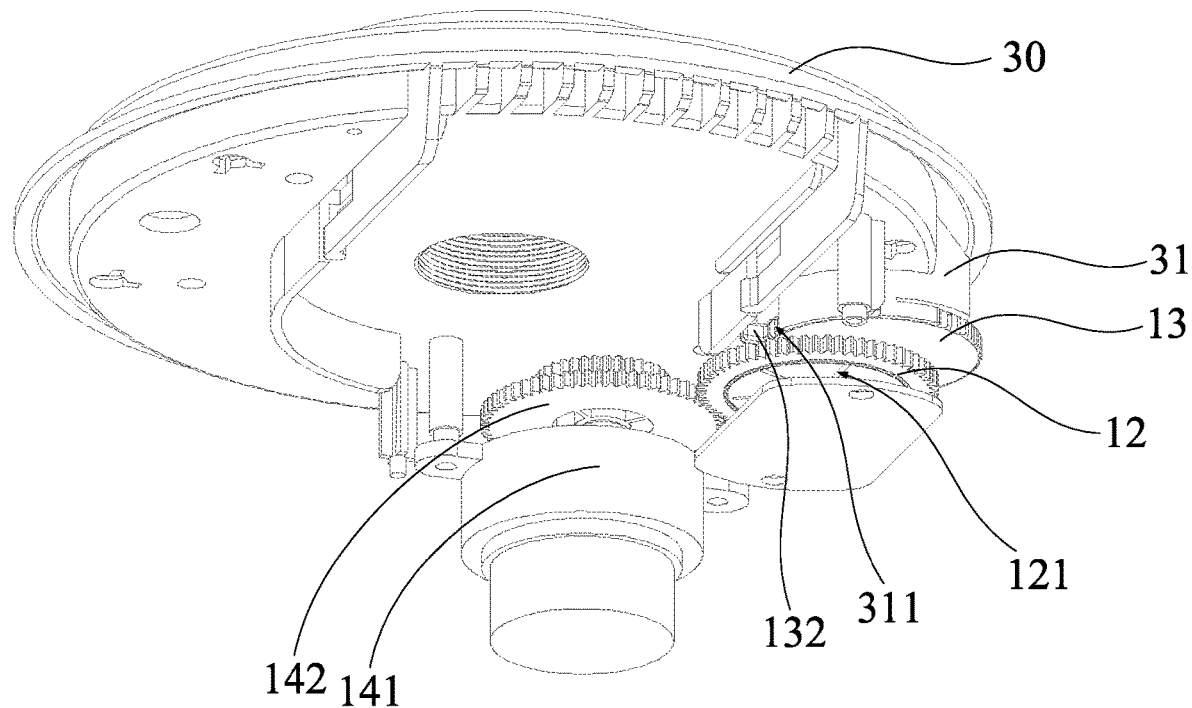
FIG. 4 is a schematic structural diagram of a projection device for generating a meteor lighting effect according to the present invention in another angle.
Figure 5:
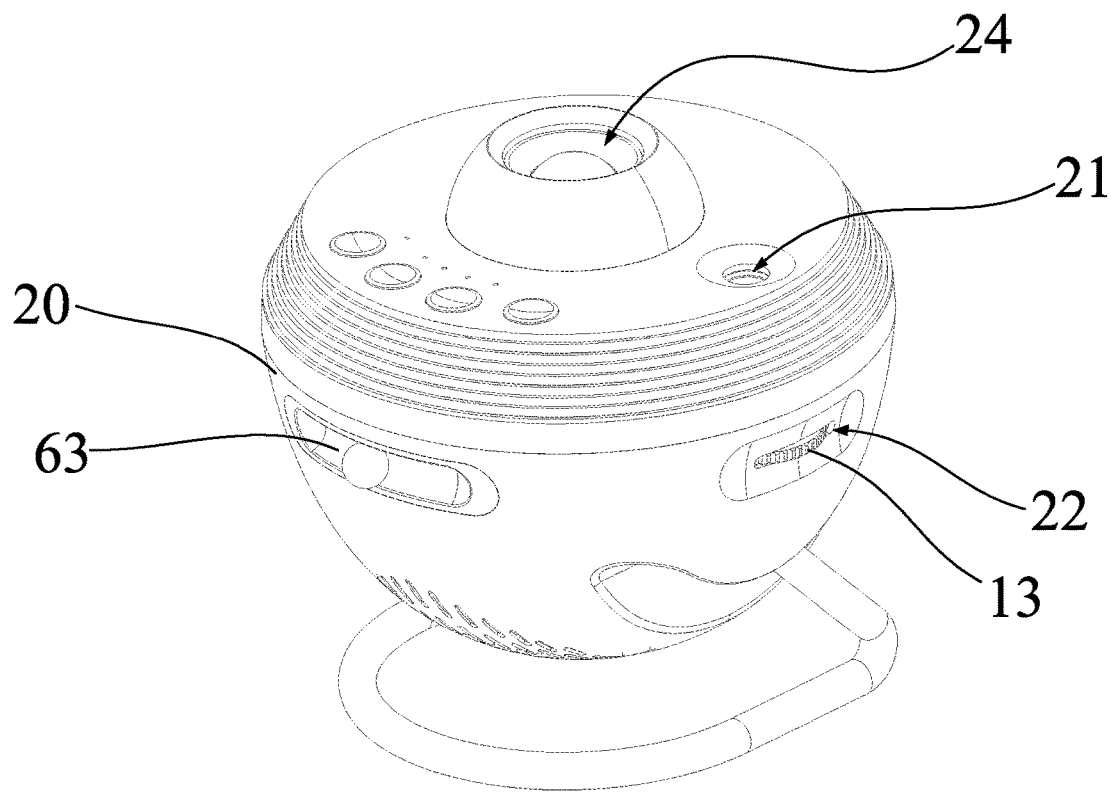
FIG. 5 is a schematic structural diagram of an embodiment of a projection lamp for generating a meteor lighting effect according to the present invention.

In another embodiment, as shown in FIG. 3, since the driving motor 141 is used to directly drive the first optical path plate 12 to rotate in the above embodiment, there is a technical problem that the meteor lighting effect is not clear due to too fast rotation speed of the first optical path plate 12. Therefore, in this embodiment, a transmission gear 90 is further arranged between the first optical path plate 12 and the driving gear 142, wherein the number of teeth of the first optical path plate 12 and the transmission gear 90 is greater than that of the driving gear 142, so as to effectively reduce the rotation speed of the first optical path plate 12, and further improve the definition and stability of the meteor lighting effect projected by the projection device 10.

Further, as shown in FIGS. 1 to 3 and 9 to 11, the second optical path plate 13 has a central axis, and the second optical path plate 13 rotates with the central axis as a rotation center. In this embodiment, the second optical path plate 13 can rotate around the central axis thereof, so as to change an extension direction of the light-transmitting area 131 of the second optical path plate 13, and further change a moving direction of the meteor lighting effect, thereby facilitating the user to adjust the dynamic effect of the light according to the using environment of the projection device 10, and effectively improving the practicability of the projection device 10.

Further, as shown in FIGS. 1 to 3, the projection device 10 further comprises a lens group arranged above the light-transmitting area 131 of the second optical path plate 13, and the lens group comprises a fixing sleeve 151 and at least one first imaging lens 152 arranged in the fixing sleeve 151. In this embodiment, the lens group is configured to adjust the light passing through the second optical path plate 13. Specifically, the lens group is arranged above the light-transmitting area 131 of the second optical path plate 13, wherein the fixing sleeve 151 is configured to fix the first imaging lens 152, and the first imaging lens 152 is configured to adjust the light passing through the second optical path plate 13, so as to improve the definition of the meteor lighting effect projected by the projection device 10.

In addition, a plurality of first imaging lens 152 may be provided, and may specifically comprise an imaging lens for increasing a projection area and an imaging lens for improving pattern definition, which is not specifically limited herein.

The present invention further provides a projection lamp for generating a meteor lighting effect. The projection lamp for generating the meteor lighting effect comprises a projection device 10 for generating the meteor lighting effect and a housing 20. For the specific structure of the projection device 10 for generating the meteor lighting effect, refer to the above embodiments. Since the projection lamp uses all technical solutions of all the above embodiments, the projection lamp at least has all beneficial effects brought by the technical solutions of the above embodiments. Details are not described herein again. The housing 20 is provided with a first light-emitting hole 21, the first incoherent light source 11 and the first optical path plate 12 are arranged in the housing 20, and the second optical path plate 13 is mounted on the housing 20, wherein the first incoherent light source 11 emits light toward the first light-emitting hole 21.

Further, as shown in FIGS. 1 to 8, the projection lamp further comprises a first fixing seat 40 arranged in the housing 20, and the first incoherent light source 11, the first optical path plate 12 and the driving assembly 14 are fixed on the first fixing seat 40. In this embodiment, the first fixing seat 40 provides a mounting position for the first incoherent light source 11, the first optical path plate 12 and the driving assembly 14, so as to maintain the stability of the first optical path plate 12 during the rotation process.

Further, as shown in FIGS. 4 to 7, the housing 20 is provided with a first mounting hole 22, the projection lamp comprises a mounting bracket 30 arranged in the housing 20, the lens group and the second optical path plate 13 are arranged on the mounting bracket 30, and the second optical path plate 13 partially extends out of the housing 20 from the first mounting hole 22. In this embodiment, the mounting bracket 30 is configured to provide a mounting position for the lens group and the second optical path plate 13, wherein the second optical path plate 13 is mounted on the mounting bracket 30 and extends out of the housing 20 through the first mounting hole 22, so that a user can dial the second optical path plate 13 to rotate through the second optical path plate 13 outside the housing 20 to change a sliding direction of a meteor lighting effect projected by the projection lamp.

Further, as shown in FIGS. 4 to 7, the mounting bracket 30 is provided with a first limiting boss 31, a side wall of the second optical path plate 13 is provided with a limiting rod 132, a limiting groove 311 is formed in the first limiting boss 31, the second optical path plate 13 is arranged in the first limiting boss 31, and the limiting rod 132 is located in the limiting groove 311. It can be understood that the second optical path plate 13 can rotate to adjust the sliding direction of the meteor lighting effect, however, the light-transmitting area 131 must be always located on the irradiation surface 111 of the first incoherent light source 11, so the rotation angle of the second optical path plate 13 cannot be too large, and the provision of the limiting rod 132 can effectively prevent the light-transmitting area 131 of the second optical path plate 13 from separating from the irradiation surface 111 of the first incoherent light source 11, thereby effectively improving the practicability of the projection lamp.

Further, as shown in FIGS. 5 to 8, the projection lamp further comprises a light-emitting mechanism, the light-emitting mechanism comprises a light-emitting assembly 50, a film assembly 60 and an imaging assembly 70, and the housing 20 is provided with a second mounting hole 23 and a second light-emitting hole 24; the light-emitting assembly 50 is arranged in the housing 20, the light-emitting assembly 50 comprises at least one second incoherent light source 51 and at least one condenser lens 52, the second incoherent light source 51 emits light towards the second light-emitting hole 24, and the condenser lens 52 is arranged on an irradiation surface of the second incoherent light source 51; the film assembly 60 is arranged in the second mounting hole 23, the film assembly 60 comprises a film sheet 61 with a galaxy starry sky pattern, and the film sheet 61 is arranged on another side of the condenser lens 52 relative to the second incoherent light source 51; and the imaging assembly 70 is arranged in the housing 20, the imaging assembly 70 comprises at least one second imaging lens 71, at least one adjusting lens 72 and at least one wide-angle lens 73 that are sequentially arranged in a projection direction of the film sheet 61. In this embodiment, the second incoherent light source 51 is a light-emitting member of a light-emitting mechanism for irradiating a pattern to project the pattern onto the light-shadow bearing surface, a plurality of second incoherent light sources 51 may be provided to increase the light intensity, and the condenser lens 52 is configured to condense the light emitted by the second incoherent light source 51 to increase the light intensity, and is arranged on the irradiation surface of the second incoherent light source 51.

The film sheet 61 is a pattern bearing member of the light-emitting mechanism, and the film sheet 61 is provided with a pattern similar to a galaxy starry sky, and is arranged on another side of the condenser lens 52 relative to the second incoherent light source 51, so that the condenser lens 52 can map the galaxy starry sky pattern on the film sheet 61 onto the light-shadow bearing surface when projecting the condensed light onto the film sheet 61, and the light-shadow bearing surface presents the effect of the galaxy starry sky.

The imaging assembly 70 is configured to process the pattern light spots passing through the film sheet 61 so as to clearly and completely present the pattern on the film sheet 61 on the light-shadow bearing surface. Specifically, a second imaging lens 71, an adjusting lens 72 and a wide-angle lens 73 are sequentially arranged in the projection direction of the film sheet 61, the second imaging lens 71 is configured to collect effective pattern light spots passing through the film sheet 61 to form a real image pattern, and to project the real image pattern to the adjusting lens 72, then the adjusting lens 72 reshapes and corrects the real image pattern and projects the real image pattern to the wide-angle lens 73, and the wide-angle lens 73 magnifies the adjusted real image pattern and projects the magnified real image pattern onto the light-shadow bearing surface, so that a clear enlarged pattern effect is presented on the light-shadow bearing surface.

It should be explained that the second incoherent light source 51, the condenser lens 52, the film sheet 61, and the lens of the imaging assembly 70 are all coaxially arranged, so that the loss of the light emitted by the second incoherent light source 51 can be effectively reduced, and the brightness of the pattern projected by the projection lamp is further improved.

Further, as shown in FIGS. 5 to 8, the film assembly 60 further comprises a second fixing seat 62 and a film tray 63, the film sheet 61 is arranged on the film tray 63, the second fixing seat 62 is fixed in the housing 20 at a position corresponding to the second mounting hole 23, and the film tray 63 is inserted into the second mounting hole 23 and extends into the second fixing seat 62. In this embodiment, the second fixing seat 62 is configured to provide a movable mounting position for the film tray 63. Specifically, the second fixing seat 62 is fixed in the housing 20 and is arranged corresponding to the position of the second mounting hole 23, and the film tray 63 is movably inserted into the second fixing seat 62 through the second mounting hole 23, so that the user can replace the film sheet 61 at any time according to the use scenario. This makes the projection lamp suitable for more scenarios, and therefore the practicability of the projection lamp is effectively improved.

Further, as shown in FIGS. 5 to 8, the driving assembly 14 comprises a driving motor 141 and a driving gear 142 arranged on the driving motor 141, the film assembly 60 further comprises a rotary gear 65 engaged with the driving gear 142, the film sheet 61 is fixed on the rotary gear 65, the film tray 63 is provided with a mounting groove 631, a bottom wall of the mounting groove 631 is provided with a limiting hole 632, a second limiting boss 651 is arranged on one side of the rotary gear 65, the rotary gear 65 is arranged in the mounting groove 631, and the second limiting boss 651 is located in the limiting hole 632. In this embodiment, the mounting groove 631 is configured to mount and fix the rotary gear 65. Specifically, a second limiting boss 651 is convexly arranged at a lower portion of the rotary gear 65, a limiting hole 632 is arranged on the bottom wall of the mounting groove 631, and the second limiting boss 651 of the rotary gear 65 is arranged in the limiting hole 632, so that the rotary gear 65 is effectively limited to move in the horizontal direction, and further the rotational stability of the rotary gear 65 is improved. The film sheet 61 is fixed on the rotary gear 65, so that the rotation stability of the film sheet 61 is effectively maintained.

It should be explained that a middle portion of the rotary gear 65 is hollow, so that the light of the second incoherent light source 51 can be irradiated onto the film sheet 61 through the limiting hole 632.

Further, as shown in FIGS. 5 to 8, the film assembly 60 further comprises a fixing buckle 64, the film sheet 61 is fixedly arranged on the fixing buckle 64, and a clamping block 652 matched with the fixing buckle 64 is arranged on another side of the rotary gear 65 relative to the second limiting boss 651, and the film sheet 61 is stably fixed on the rotary gear 65 through the rotary matching of the fixing buckle 64 and the clamping block 652, so that the practicability of the projection lamp is effectively improved.

It should be explained that at least the middle portion of the fixing buckle 64 is made of a transparent material, so that the light of the second incoherent light source 51 can irradiate on the film sheet 61 to form a galaxy starry sky pattern preset by the film sheet 61.

Further, as shown in FIGS. 5 to 8, the film assembly 60 further comprises an annular buckle 66 for fixing the rotary gear 65, and a clamping hole 633 matched with the annular buckle 66 is formed at the bottom of the mounting groove 631. In this embodiment, the annular buckle 66 is configured to limit the movement of the rotary gear 65 in a vertical direction. Specifically, the cross section of the annular buckle 66 is "L" shaped, the annular buckle 66 is fastened above the rotary gear 65, and meanwhile, the bottom of the annular buckle 66 is clamped with the bottom wall of the mounting groove 631 in a clamping fixing manner; therefore, the movement of the rotary gear 65 in the vertical direction is effectively limited, and the structural stability of the projection lamp is effectively improved.

Figure 6:
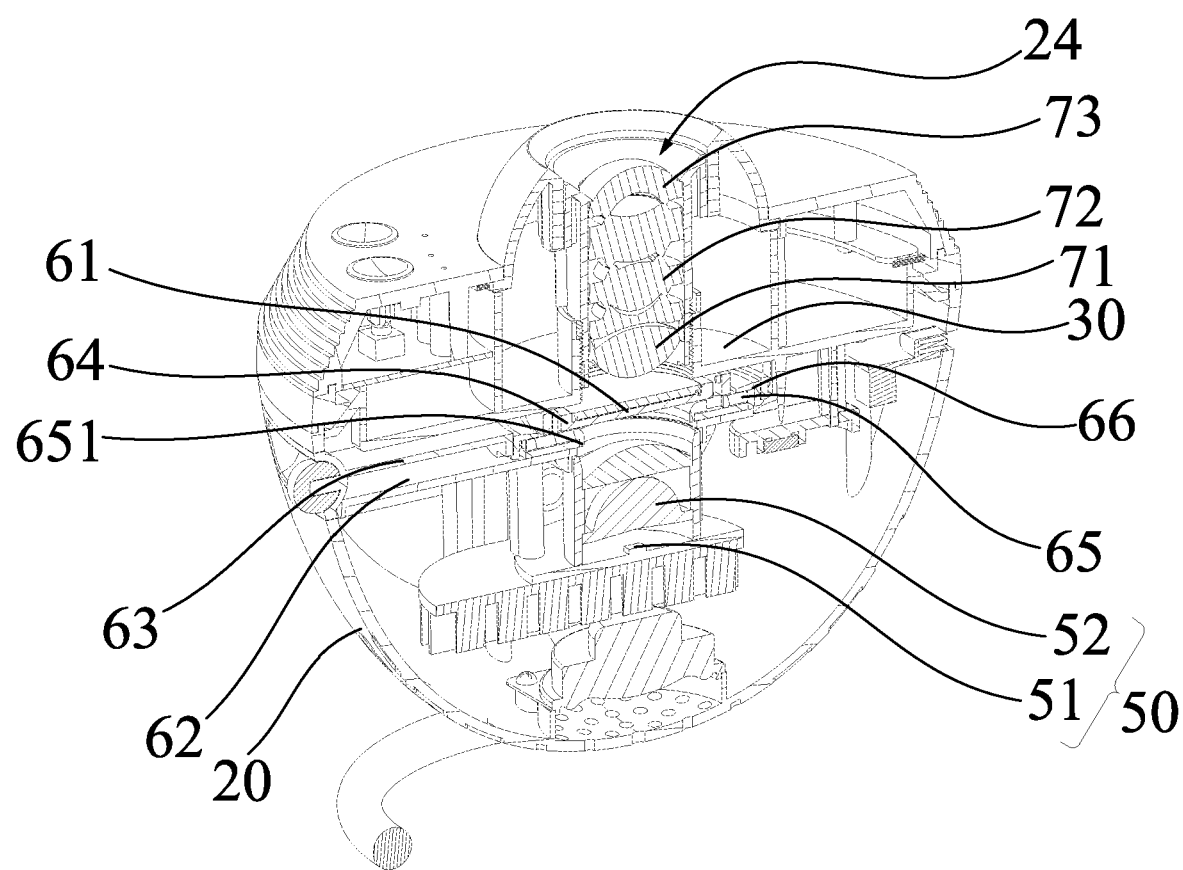
FIG. 6 is a schematic diagram of a cross-sectional structure of a projection lamp for generating a meteor lighting effect according to the present invention.
Figure 7:
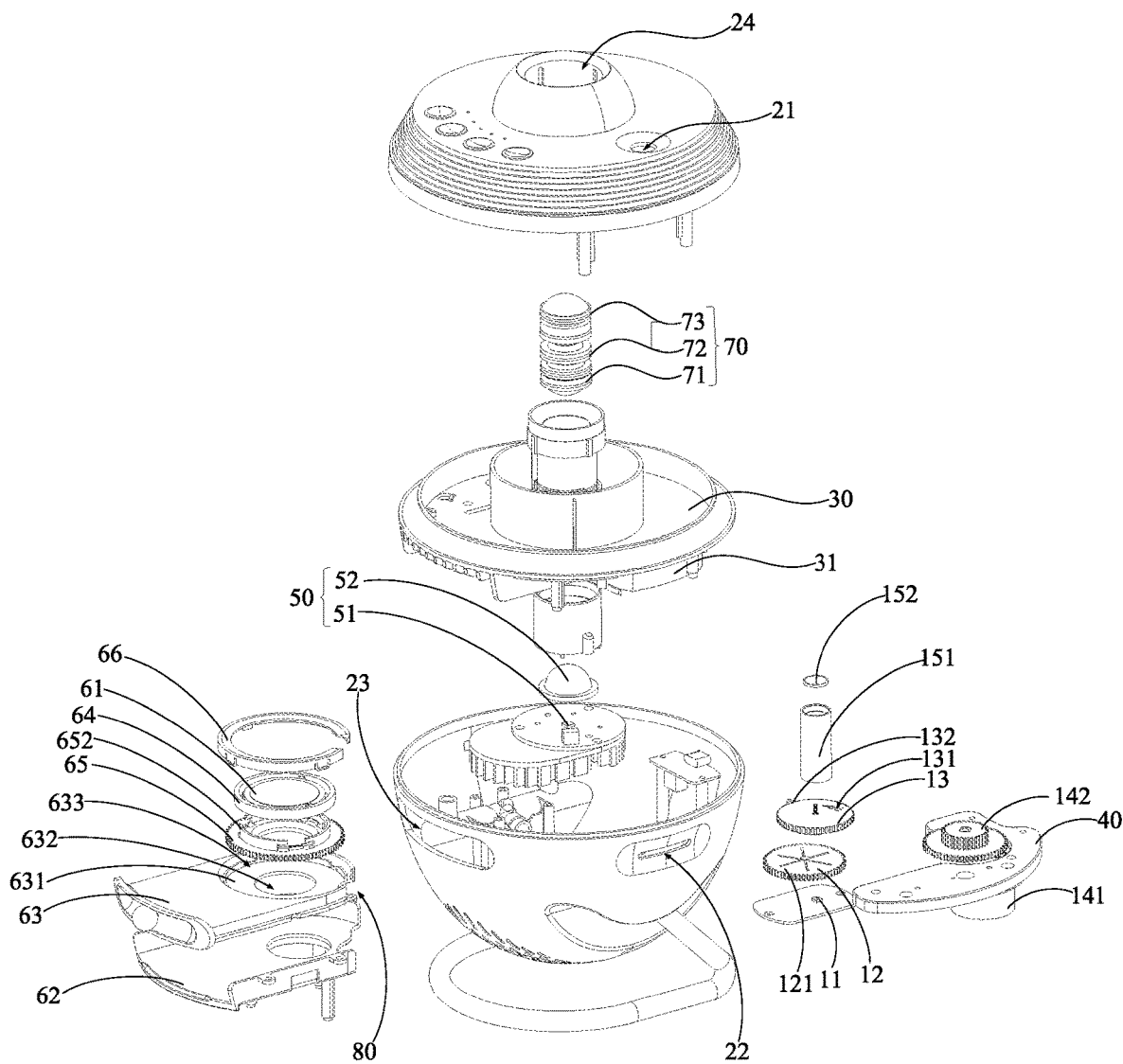
FIG. 7 is a schematic structural diagram of a projection lamp for generating a meteor lighting effect according to the present invention in an angle exploded state.
Figure 8:
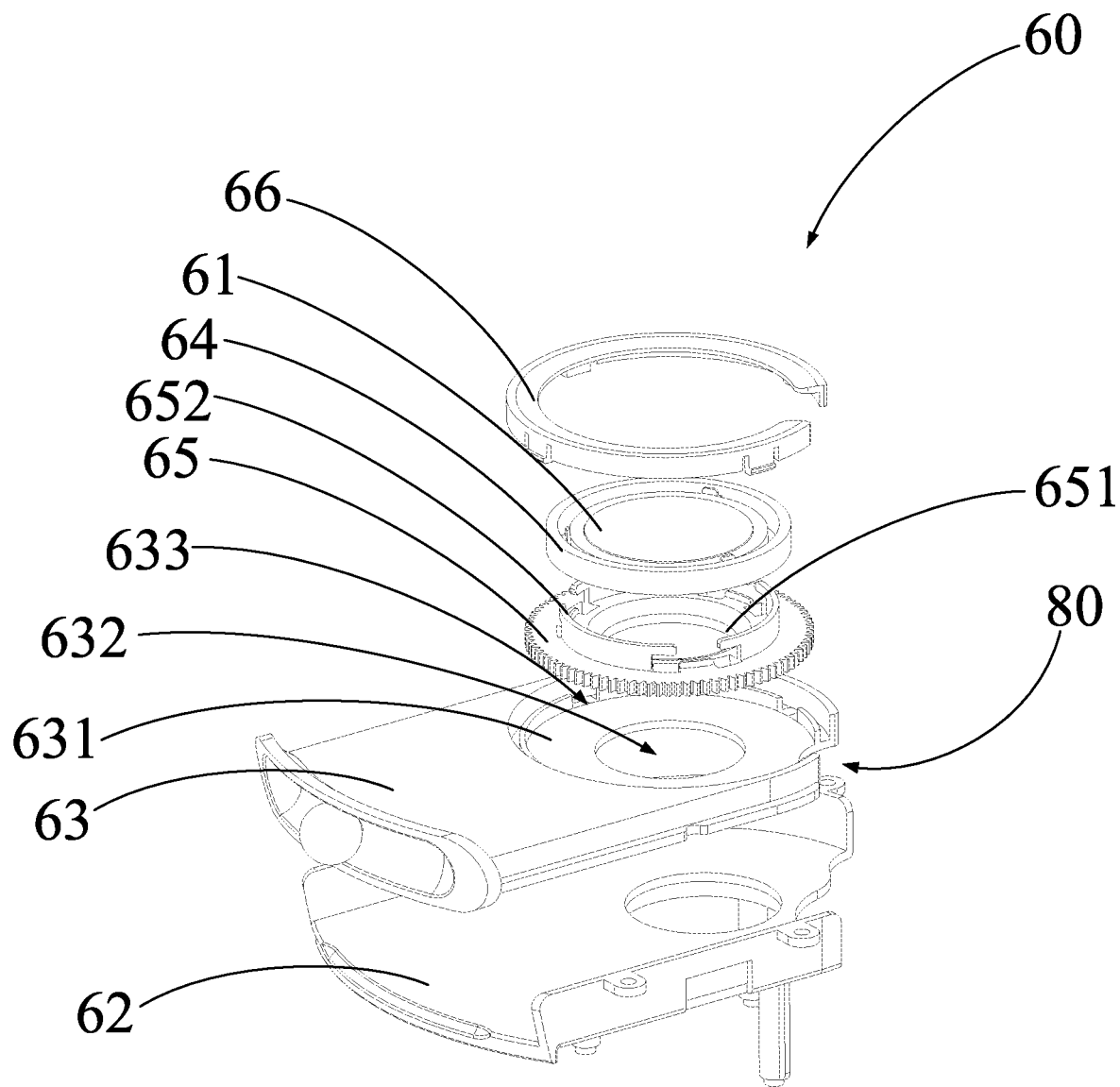
FIG. 8 is a schematic structural diagram of a film assembly in an exploded state.
Figure 9:
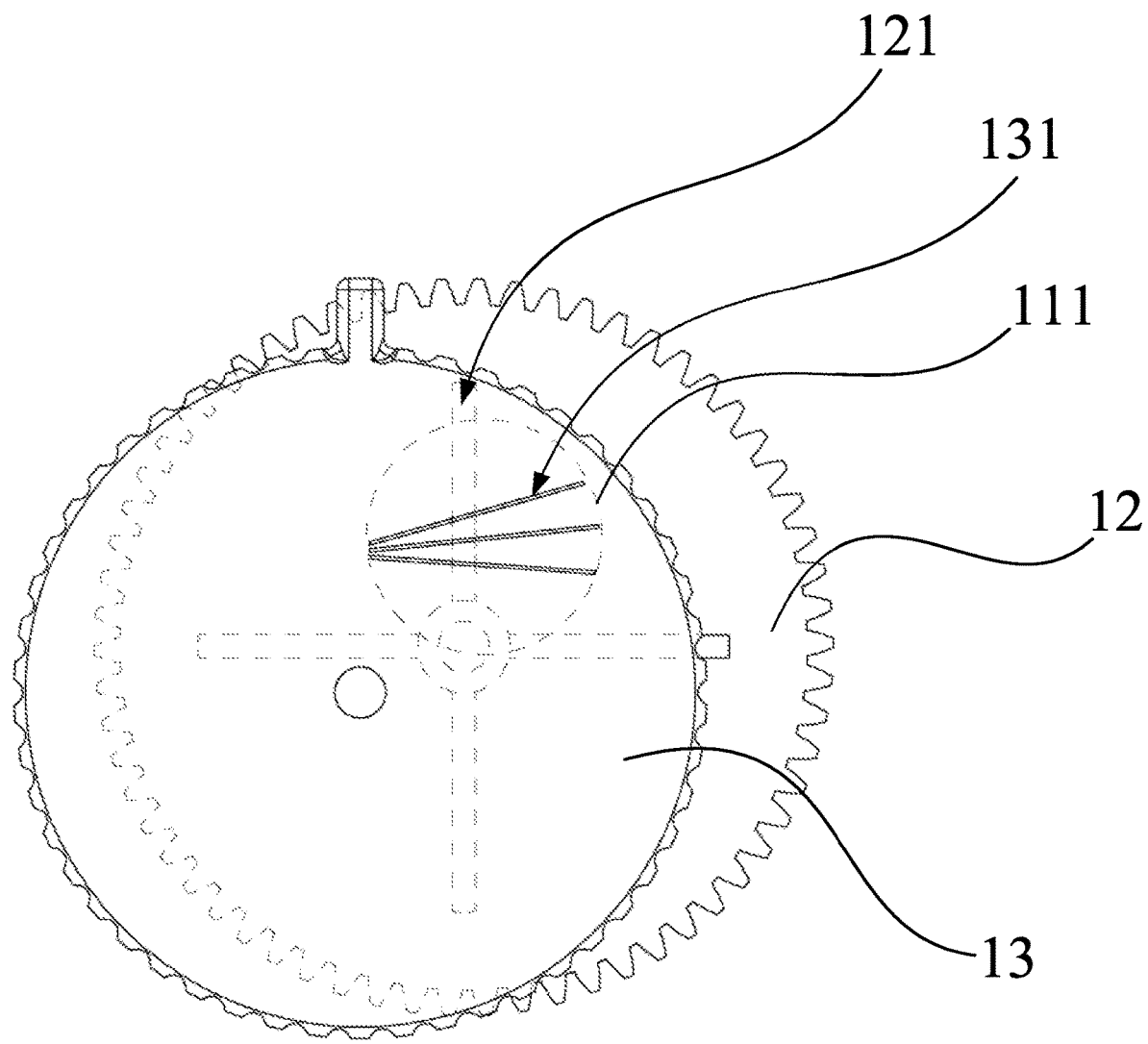
FIG. 9 is a schematic principle diagram of the projection effect of a first optical path plate and a second optical path plate from an angle.
Figure 10:
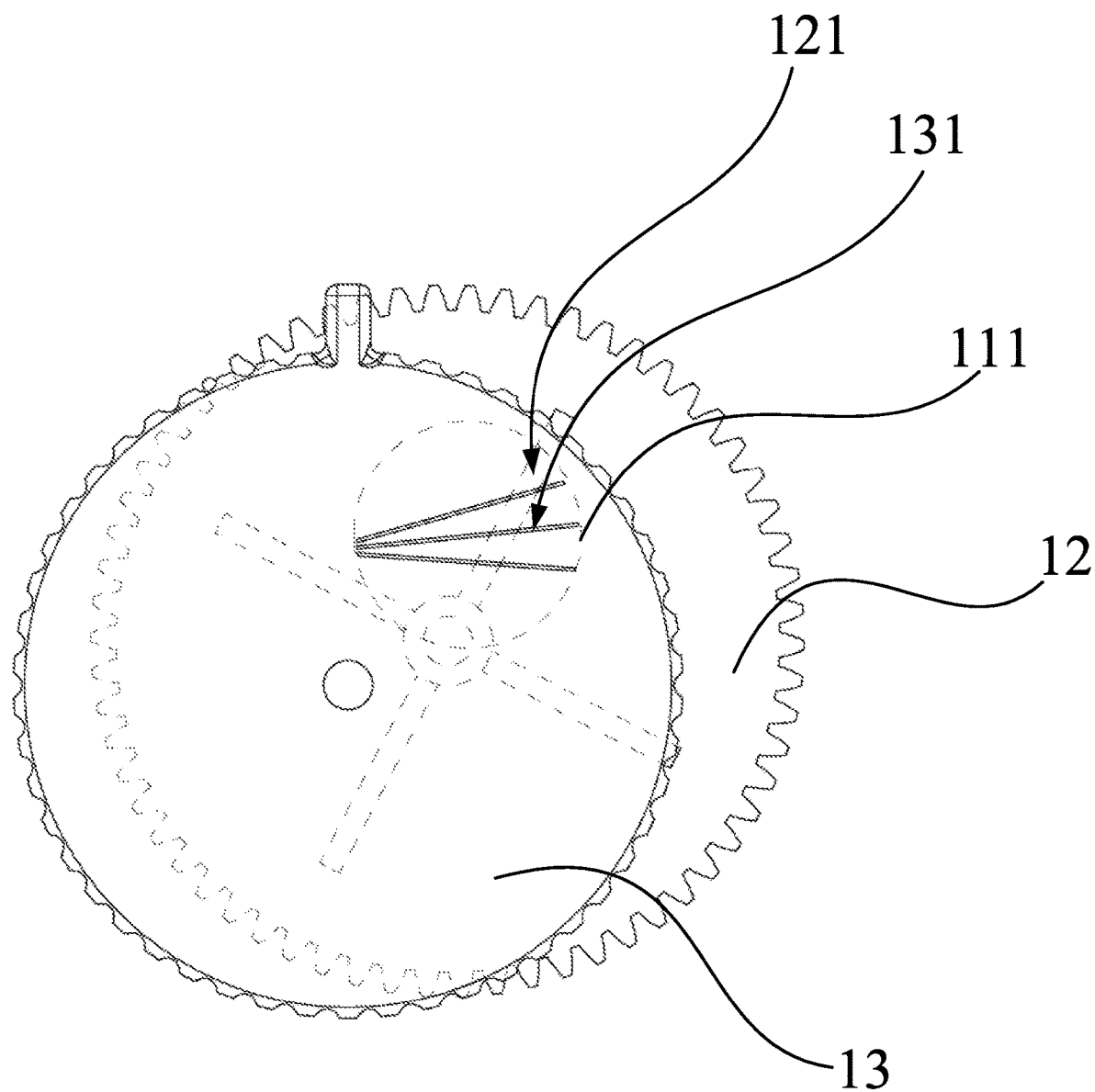
FIG. 10 is a principle diagram of the projection effect of a first optical path plate and a second optical path plate from another angle.
Figure 11:
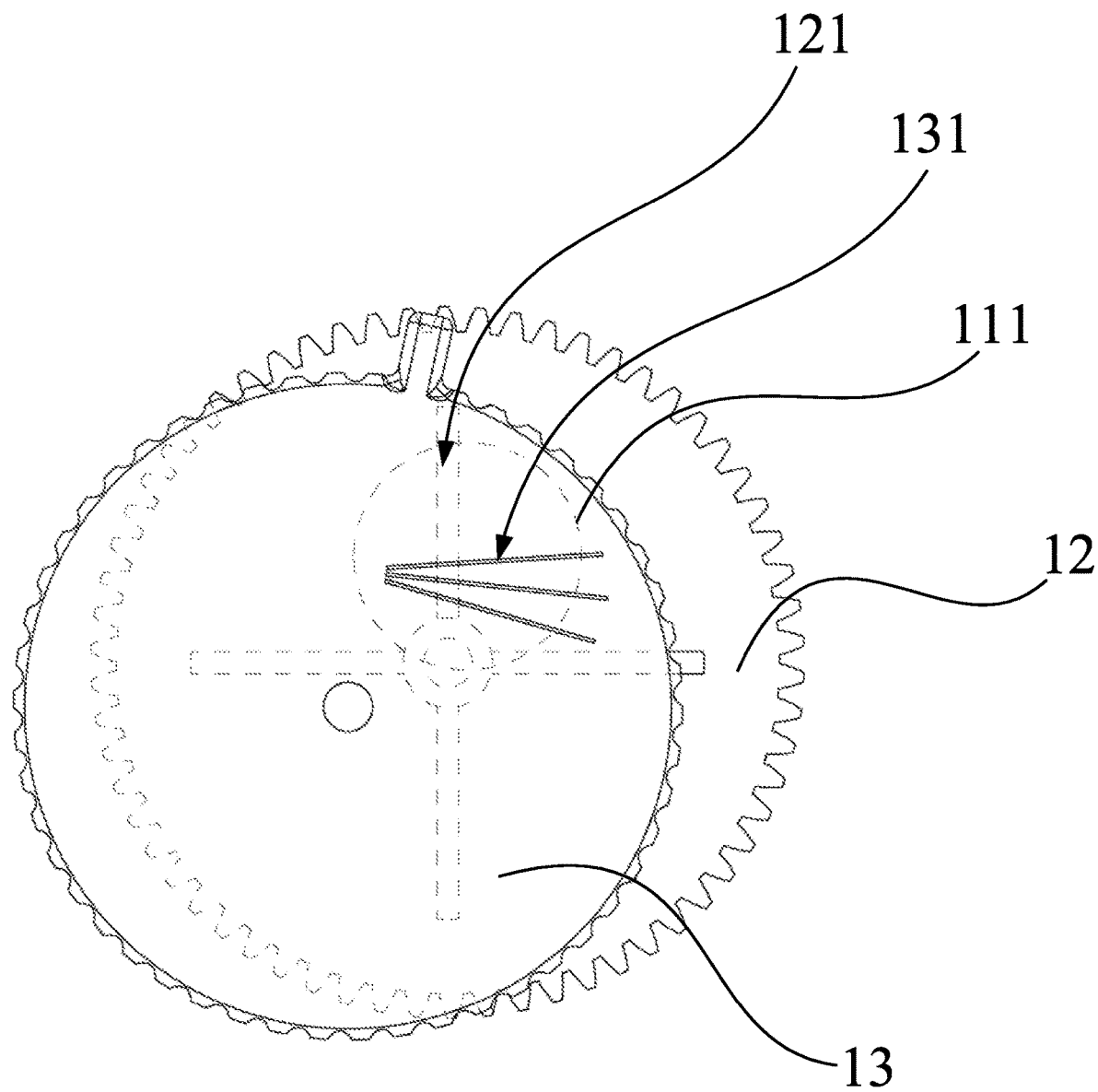
FIG. 11 is a principle diagram of the projection effect of a first optical path plate and a second optical path plate from still another angle.
Figure 12:
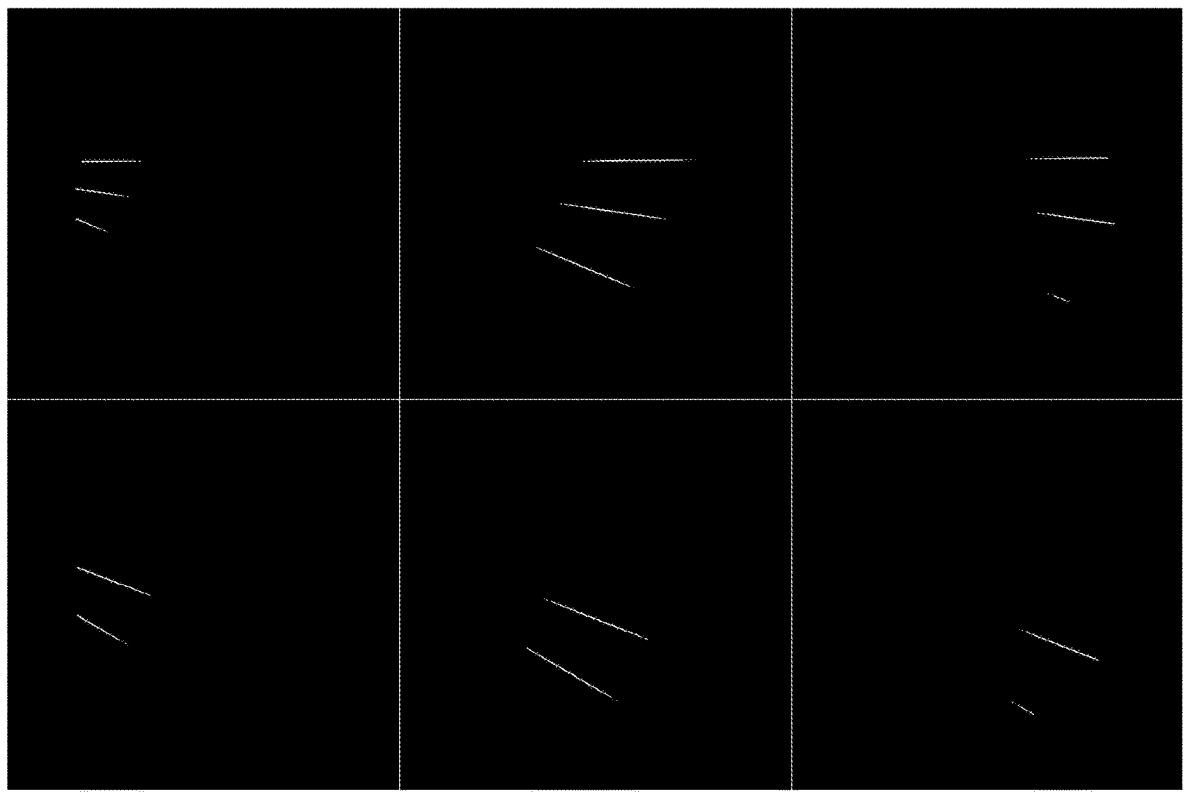
FIG. 12 is a schematic diagram of a lighting effect of a projection device for generating a meteor lighting effect according to the present invention.

Further, as shown in FIGS. 6 to 8, the film tray 63 and the annular buckle 66 are provided with a clearance groove 80 for clearance of the driving gear 142, the clearance groove 80 is configured to provide an assembly position for the engagement of the rotary gear 65 and the driving gear 142, and the driving gear 142 passes through the clearance groove 80 to engage with the rotary gear 65, so as to drive the rotary gear 65 to rotate.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

What is claimed is:

1. A projection device for generating a meteor lighting effect, comprising:
   a first incoherent light source, wherein the first incoherent light source has an irradiation surface;
   a first optical path plate, wherein the first optical path plate partially covers the irradiation surface of the first incoherent light source, and at least one strip-shaped light-transmitting hole is formed in the first optical path plate from a central axis of the first optical path plate toward an outer side direction of the first optical path plate;
   a second optical path plate, wherein the second optical path plate is arranged on a side of the first optical path plate that faces away from the first incoherent light source, at least one strip-shaped light-transmitting area is arranged at a position that is on the second optical path plate and that corresponds to the irradiation surface of the first incoherent light source, and the light-transmitting area is arranged to intersect with a projection of the light-transmitting hole on a horizontal plane; and
   a driving assembly, wherein the driving assembly is in driving connection with the first optical path plate to drive the first optical path plate to rotate;
   wherein the second optical path plate is provided with a plurality of light-transmitting areas, and the plurality of light-transmitting areas are arranged non-parallel to each other.

2. The projection device for generating the meteor lighting effect according to claim 1, wherein there are a plurality of light-transmitting holes, and the plurality of light-transmitting holes are arranged at intervals around the central axis of the first optical path plate.

3. The projection device for generating the meteor lighting effect according to claim 1, wherein the first optical path plate is gear-shaped, the driving assembly comprises a driving motor and a driving gear arranged on the driving motor, and the driving gear is engaged with the first optical path plate.

4. The projection device for generating the meteor lighting effect according to claim 1, wherein the second optical path plate has a central axis, and the second optical path plate rotates with the central axis as a rotation center.

5. The projection device for generating the meteor lighting effect according to claim 1, wherein the projection device further comprises a lens group arranged above the light-transmitting area of the second optical path plate, and the lens group comprises a fixing sleeve and at least one first imaging lens arranged in the fixing sleeve.

6. A projection lamp for generating a meteor lighting effect, comprising:
- a housing, wherein the housing is provided with a first light-emitting hole;
- a first incoherent light source, wherein the first incoherent light source is arranged in the housing, and the first incoherent light source emits light toward the first light-emitting hole;
- a first optical path plate, wherein the first optical path plate is arranged in the housing, the first optical path plate partially covers an irradiation surface of the first incoherent light source, and at least one strip-shaped light-transmitting hole is formed in the first optical path plate from a central axis of the first optical path plate toward an outer side direction of the first optical path plate;
- a second optical path plate, wherein the second optical path plate is mounted on the housing, the second optical path plate is arranged on a side of the first optical path plate that faces away from the first incoherent light source, at least one strip-shaped light-transmitting area is arranged at a position that is on the second optical path plate and that corresponds to the irradiation surface of the first incoherent light source, and the light-transmitting area is arranged to intersect with a projection of the light-transmitting hole on a horizontal plane; and
- a driving assembly, wherein the driving assembly is arranged in the housing, the driving assembly is in driving connection with the first optical path plate to drive the first optical path plate to rotate;
- wherein the second optical path plate is provided with a plurality of light-transmitting areas, and the plurality of light-transmitting areas are arranged non-parallel to each other.

7. The projection lamp for generating the meteor lighting effect according to claim 6, wherein there are a plurality of light-transmitting holes, and the plurality of light-transmitting holes are arranged at intervals around the central axis of the first optical path plate.

8. The projection lamp for generating the meteor lighting effect according to claim 6, wherein the first optical path plate is gear-shaped, the driving assembly comprises a driving motor and a driving gear arranged on the driving motor, and the driving gear is engaged with the first optical path plate.

9. The projection lamp for generating the meteor lighting effect according to claim 6, wherein the second optical path plate has a central axis, and the second optical path plate rotates with the central axis as a rotation center.

10. The projection lamp for generating the meteor lighting effect according to claim 6, wherein the projection lamp further comprises a lens group arranged above the light-transmitting area of the second optical path plate, and the lens group comprises a fixing sleeve with one end fixed to the first light-emitting hole and at least one first imaging lens arranged in the fixing sleeve.

11. The projection lamp for generating the meteor lighting effect according to claim 10, wherein the housing is provided with a first mounting hole, the projection lamp comprises a mounting bracket arranged in the housing, the lens group and the second optical path plate are arranged on the mounting bracket, and the second optical path plate partially extends out of the housing from the first mounting hole.

12. The projection lamp for generating the meteor lighting effect according to claim 11, wherein the mounting bracket is provided with a first limiting boss, a side wall of the second optical path plate is provided with a limiting rod, a limiting groove is formed in the first limiting boss, the second optical path plate is arranged in the first limiting boss, and the limiting rod is located in the limiting groove.

13. The projection lamp for generating the meteor lighting effect according to claim 6, wherein the projection lamp further comprises a first fixing seat arranged in the housing, and the first incoherent light source, the first optical path plate and the driving assembly are fixed on the first fixing seat.

14. The projection lamp for generating the meteor lighting effect according to claim 6, wherein the projection lamp further comprises a light-emitting mechanism, the light-emitting mechanism comprises a light-emitting assembly, a film assembly and an imaging assembly, and the housing is provided with a second mounting hole and a second light-emitting hole;
- the light-emitting assembly is arranged in the housing and comprises at least one second incoherent light source and at least one condenser lens, the second incoherent light source emits light towards the second light-emitting hole, and the condenser lens is arranged on an irradiation surface of the second incoherent light source;
- the film assembly is arranged in the second mounting hole and comprises a film sheet with a galaxy starry sky pattern, and the film sheet is arranged on another side of the condenser lens relative to the second incoherent light source; and
- the imaging assembly is arranged in the housing and comprises at least one second imaging lens, at least one adjusting lens and at least one wide-angle lens which are sequentially arranged in a projection direction of the film sheet.

15. The projection lamp for generating the meteor lighting effect according to claim 14, wherein the film assembly further comprises a second fixing seat and a film tray, the film sheet is arranged on the film tray, the second fixing seat is fixed in the housing at a position corresponding to the second mounting hole, and the film tray is inserted into the second mounting hole and extends into the second fixing seat.

16. The projection lamp for generating the meteor lighting effect according to claim 15, wherein the driving assembly comprises a driving motor and a driving gear arranged on the driving motor, the film assembly further comprises a rotary gear engaged with the driving gear, the film sheet is fixed on the rotary gear, the film tray is provided with a mounting groove, a bottom wall of the mounting groove is provided with a limiting hole, a second limiting boss is arranged on one side of the rotary gear, the rotary gear is arranged in the mounting groove, and the second limiting boss is located in the limiting hole.

17. The projection lamp for generating the meteor lighting effect according to claim 16, wherein the film assembly further comprises a fixing buckle, the film sheet is fixedly arranged on the fixing buckle, and a clamping block matched with the fixing buckle is arranged on another side of the rotary gear relative to the second limiting boss.

18. The projection lamp for generating the meteor lighting effect according to claim 17, wherein the film assembly further comprises an annular buckle for fixing the rotary gear, and a clamping hole matched with the annular buckle is formed at the bottom of the mounting groove.

* * * * *